(12) United States Patent
Palmer et al.

(10) Patent No.: US 6,887,504 B2
(45) Date of Patent: May 3, 2005

(54) MARKING PEN FOR DECORATING FOOD

(76) Inventors: Stephen L. Palmer, 4391 Cameron Rd., Cameron Park, CA (US) 95682; William R. Palmer, 3026 Whitetail Dr., Rescue, CA (US) 95672

( * ) Notice: Subject to any disclaimer, the term of this patent is extended or adjusted under 35 U.S.C. 154(b) by 84 days.

(21) Appl. No.: 09/974,633

(22) Filed: Oct. 9, 2001

(65) Prior Publication Data

US 2003/0099746 A1 May 29, 2003

Related U.S. Application Data

(60) Provisional application No. 60/240,440, filed on Oct. 13, 2000.

(51) Int. Cl.[7] .............................. B43K 1/00; B43K 5/00
(52) U.S. Cl. ...................... 426/115; 426/112; 426/383; 401/198
(58) Field of Search ................................ 426/383, 115, 426/104, 112; 401/198

(56) References Cited

U.S. PATENT DOCUMENTS

| | | | | |
|---|---|---|---|---|
| 3,446,143 A | * | 5/1969 | Williamson | |
| 3,663,470 A | | 5/1972 | Nishimura et al. | |
| 3,737,398 A | | 6/1973 | Yamaguchi | |
| 3,852,494 A | * | 12/1974 | Williamson | |
| 3,881,828 A | * | 5/1975 | Jones | |
| 3,993,409 A | * | 11/1976 | Hart | |
| 4,024,287 A | * | 5/1977 | Golchert | |
| 4,083,906 A | | 4/1978 | Schindler et al. | |
| 4,115,595 A | | 9/1978 | Jordan | |
| 4,560,562 A | * | 12/1985 | Schroeder | |
| 4,578,273 A | * | 3/1986 | Krubert | |
| 4,681,471 A | * | 7/1987 | Hayduchok | |
| 4,753,811 A | | 6/1988 | Ikeuchi et al. | |
| 5,069,918 A | | 12/1991 | Graf et al. | |
| 5,213,504 A | * | 5/1993 | Lee et al. | |
| 5,453,122 A | * | 9/1995 | Lyon | |
| 5,554,658 A | | 9/1996 | Rosenblatt | |
| 5,885,020 A | * | 3/1999 | Rossi | |
| 5,947,624 A | * | 9/1999 | Davignon | |
| 5,964,931 A | * | 10/1999 | Korper | |
| 6,086,279 A | * | 7/2000 | Yen | |
| 6,299,374 B1 | | 10/2001 | Naor et al. | |
| 6,402,413 B1 | * | 6/2002 | Schwartman | |
| 6,474,893 B1 | * | 11/2002 | Osada et al. | |
| 6,511,687 B2 | * | 1/2003 | Hoy | |

FOREIGN PATENT DOCUMENTS

| | | | |
|---|---|---|---|
| DE | 2555391 | * | 11/1976 |
| DE | 2535906 | * | 2/1977 |
| DE | 3135800 | * | 3/1983 |
| JP | 52-143118 | * | 11/1977 |
| JP | 54-008020 | * | 1/1979 |
| JP | 60-255837 | * | 12/1985 |
| JP | 7-188600 | * | 7/1995 |
| JP | 8-108682 | * | 4/1996 |

* cited by examiner

*Primary Examiner*—Steve L. Weinstein
(74) *Attorney, Agent, or Firm*—Thomas R. Lampe

(57) ABSTRACT

An apparatus and method for decorating an edible food without substantially deforming the edible food. A container delivers a liquid decorating substance to an elongated, soft, flexible nib. When placed in contact with a surface of the edible food and moved relative to the edible food, the nib readily laterally flexes when pressure is exerted on the surface by the nib so that the nib does not substantially deform the edible food even when the edible food is soft.

8 Claims, 7 Drawing Sheets

MARKING PEN FOR DECORATING FOOD

This application is based on and claims the benefit of U.S. Provisional Patent Application No. 60/240,440 filed on Oct. 13, 2000.

FIELD OF THE INVENTION

This invention is directed to the field of culinary arts and more specifically, to the field of decoration or enhancement of foodstuffs by application of indicia such as drawings, text and the like. The invention has particular applicability to decorating soft foods, such as newly frosted cookies, cakes or the like.

BACKGROUND OF THE INVENTION

There is a fundamental desire to enhance the physical appearance of foodstuffs for human consumption. Careful control of color, surface texture and physical arrangement of edible objects can enhance the appeal of the foodstuff. Often, artificial colors are added to foodstuffs so that they are more appealing to the eye. For example, a food grade, artificial color may be added to canned fruit to restore colors lost during processing. Sometimes, the surface texture of a food is altered so that the food appears more natural and less processed. Perhaps the most common examples of decorated foods are birthday cakes and holiday cookies. Often, a variety of flavored and/or colored frostings are applied to the surface of a cake or cookie to not only enhance the flavor of the product, but also to provide a means to improve the appearance of the food. Brightly colored frosting or gels may be applied to the surface of a cake or cookie by means of a special device designed for this purpose. Such devices may take the form of a cloth or flexible plastic tube to which is attached a nozzle. The frosting usually has the consistency of a creamy paste and may be made from ingredients including water, confectioner's sugar, shortening, flavoring, coloring and other ingredients The frosting is placed into the tube whereby manual application of pressure to the tube causes the frosting to be forced out of the nozzle. If the nozzle tip is carefully guided in close proximity to the surface of the food to be decorated, a continuous stream of frosting may be extruded from the nozzle whereby it is deposited onto the surface of the food. A skilled decorator can create artistic designs which might include crude text and graphics such as "Happy Birthday". Often the food object to be decorated is first covered with a more or less even, relatively thin, layer of a base coating material which itself is usually a frosting of a single color and which serves to smooth out surface variations in the food being coated. The base coating may be chosen to contrast with the graphics which are applied later. It has been customary to decorate cookies for special occasions such as Christmas, Easter or Hanukkah. For families with young children this activity can be especially rewarding since the process of preparing the cookie dough, baking the cookies, and after cooling, decorating the cookies can include the entire family. Since the actual processes of preparing the dough and baking the cookies in an oven involve some skill and are associated with some hazards, this portion of the cookie-making experience is usually left to the parents or older family members. Decorating the cookies however, often involves the younger members of the household. This should not be surprising since one of the earliest activities many children learn is the act of drawing and "coloring." However, coloring in a coloring book, for example is significantly easier than decorating a cookie with frosting.

Often many colors of frosting need to be used to create the desired graphic effect. For example, Christmas cookies may be decorated in the following manner: After the baked cookies are cooled, a base coat of a single color frosting is applied more or less evenly over the entire upper face of the cookie. After this base coat has dried slightly, any number of other colors of frosting may be applied either by means of spreading with a knife or with one of the aforementioned applicator devices. Since the frostings usually contain sugar and shortening they can be very messy. Additionally, the frosting sets with time. That is, water evaporating from the frosting and water which is absorbed by the cookie from the applied frosting, causes the frosting to dry and stiffen, making it difficult to spread. Moreover, if several colors of frosting are to be used to decorate the cookies, an equal number of mixing utensils, containers and applicators may be required to mix, contain and dispense the colored frostings. Furthermore, since a substantial quantity of each frosting color must be available to decorate even a small quantity of cookies, the potential for spills and messes is significant, particularly when young children are involved. Still further, the non-Newtonian nature of confectionery frosting does not promote the ready application of decoration by novices which may yield a significant mess and waste of food product. Additionally, the use of a knife to spread frosting may be dangerous for a young child since the child could be injured by the knife. Further, most children do not possess the strength or coordination to use the decorating devices described previously.

A cookie painting kit is presently available in which users are instructed to paint cookies with brushes such as may be used with water colors. These kits typically offer a single bristle brush and several small jars of paint. Significant problems exist with this type of cookie painting system. First, the brushes offered in these kits tend to drip and create messes. Second, it is difficult for children to control the amount of paint which is retained on the brush after dipping into the paint and hence the amount of paint which is deposited onto the object intended to be painted. Third, the very nature of several open bottles of paint invites spills and stains not only on the child's clothing and skin but also on counters, floors and carpets. Additionally, open bottles of paint are subject to significant evaporation and even possible contamination from foreign objects and fingers. Lastly, anyone who has watched a child use watercolors has seen the all too common, ultimate result as the child transfers the brush from one color of paint to another, thereby eventually combining all the colors together. The usual outcome of this process is that all the paint bottles will now contain a more or less useless, brown paint, as they have become cross-contaminated. Generally at this point it is necessary to discard the bottles of paint and decoration is no longer possible.

Recently, some additional attempts have been made to provide for a means of decoration of food products in which the foods to be decorated are restricted to those having hard, dry surfaces. These products do not anticipate, nor are they designed to function on extremely soft substrates such as fresh frosting. The products are essentially identical and as such, suffer from the same shortcomings. The products are nothing more than standard, felt tipped markers in which the ink has been replaced with liquid food coloring. Because these markers use hard nibs, similar to those used to write on paper, cardboard and other dry, hard surfaces, they are entirely unsuitable for writing on frosted or other soft food items. Indeed, their performance even on many dry foods is poor, owing to the fact that these relatively inflexible nibs do not readily make intimate contact with the often uneven surface of the food item. Nearly all "felt" tipped markers produced today including the aforementioned products employ nibs which are made from fibers which are bonded either in a random fashion, such as felted polyester or wool or alternately, fibers which are essentially parallel to each other and which are bonded together using a chemical binder or adhesive. Typically, polyester, nylon or acrylic fibers are bound together to produce nibs for these conventional felt pens. The nibs may be produced by die cutting the nib stock into the desired shape which is typically used for 2-dimensional nibs such as those used for broad line markers, or alternately, the nib may be ground from rod stock. Many fine line markers employ nylon or polyester nibs which have been ground to a bullet shape, wedge or similar desirable shape. These markers have been optimized to write on hard, dry surfaces. Indeed, some of the nibs used in these pens are so compacted and hard that they are capable of piercing the skin and causing injury. Most importantly, however, markers using nibs of this type are incapable of satisfactorily writing on soft surfaces such as wet or moist frosting. Furthermore, as the moisture content present on the surface of the food item to be decorated is increased, markers of the conventional type become less effective as they are incapable of providing sufficient fluid flow to the surfaces.

Additionally, the relatively rigid nature of the nibs used in conventional markers such as those used in the specific products cited above, can cause great damage to soft surfaces such as frostings used to frost cookies and cakes, since the nib gouges the frosting during the attempted writing process. Still further, this gouging action tends to deposit significant quantities of frosting on the surface of the nib. These depositions quickly fill active fluid transfer sites on the surface of the nib and soon the nib is useless as a fluid transfer element.

While some attempt has been made to satisfy the need for a system which may be used to more easily decorate cookies, none of the available means offer the inherent simplicity, convenience, performance and ease of use as that of the instant invention. Clearly, the act of decorating cookies with frosting can be a trying experience for both child and adult. Since one of the purposes of the cookie (or cake) decorating experience is to have fun and create happy memories, something is missing from presently available food decorating means.

Thus, what is lacking in the art is a means whereby young children and others who are not skilled in the art of decorating foods with frosting may satisfactorily apply decorative indicia to cookies and other foods. If a means could be devised which permitted children to safely and easily decorate foods with a minimum of waste and mess, the beneficial process of decorating cookies as a family would truly be enhanced.

The following U.S. patents are of some reference to, but do not teach or suggest the invention as disclosed and claimed herein: U.S. Pat. No. 3,663,470 issued May 16, 1972 U.S. Pat. No. 3,737,398 issued Jun. 5, 1973U.S. Pat. No. 4,083,906 issued Apr. 11, 1978 U.S. Pat. No. 4,115,595 issued Sep. 19, 1978 U.S. Pat. No. 4,753,811 issued Jun. 28, 1988 U.S. Pat. No. 5,069,918 issued Dec. 3, 1991 and U.S. Pat. No. 5,554,658 issued Sep. 10, 1996.

SUMMARY OF THE INVENTION

The instant invention provides for a fun, creative, simple, efficient and economical means to decorate a wide variety of foods. Said means being highly effective and easy to use by young children and others who are not skilled in the art of food decoration.

Accordingly, it is an object of this invention to disclose the application of a new and highly useful means whereby cookies, cakes, breads, crackers, apple slices or other foods may be decorated with minimal mess.

It is a further object of this invention to disclose a means which may be employed to provide for the decoration of foods which will not prove unnecessarily frustrating to the user.

Still another objective of this invention is to teach a means whereby individuals may enhance their skill in the artistic decoration of foods.

Yet still another objective of this invention is to provide for a system which permits the use of virtually any number of colors of decorations to be applied.

Yet another object of the instant invention is to teach a means of selectively applying flavors and/or fragrances to certain parts of foods.

Additionally it is the object of the instant invention to provide for a system which may be used to enhance the appearance of foods such as cookies or cakes, whether frosted or not, by application of detailed graphics which may not be possible with traditional means.

Another object of the instant invention is to provide a means to apply fluid in a controlled and precise manner to the surface of an object even when the surface of that object may be wet or the surface is wet and/or very soft such as wet frosting.

Still another object of the instant invention is to provide a system which will promote a spirit of cooperation.

Another object of the instant invention is to provide for a product which may be safely used by children.

Yet another object of the instant invention is to provide for a means for decorating foods whereby the user is not required to apply significant pressure or force to expel the decorating material.

It is a further object of this invention to provide for a means of personalizing edible objects such as crackers, slices of bread, flavored gelatin, cream cheese and so forth.

Still further, it is an object of the instant invention to provide for a food decorating means whereby the decorating agent is not easily contaminated.

Other objectives and advantages of this invention will become apparent from the accompanying description taken in conjunction with the following drawings.

DETAILED DESCRIPTION OF THE INVENTION

Figure 1:
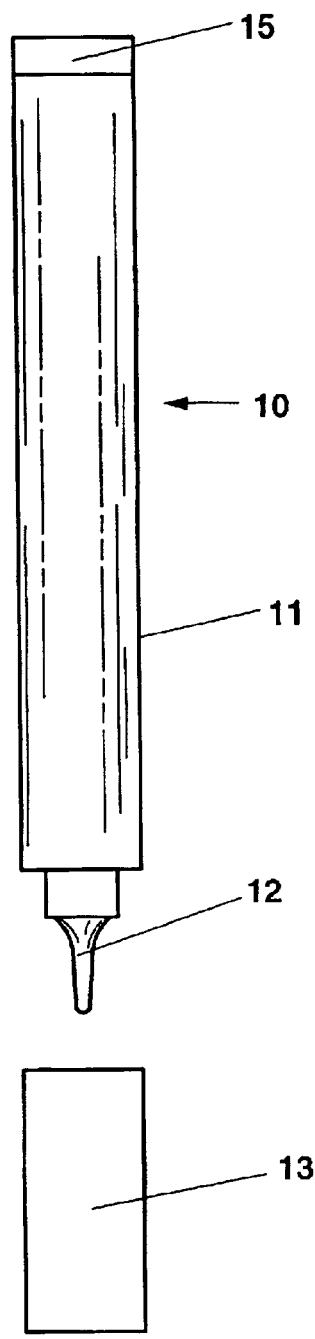
FIG. 1 is an elevational view illustrating one embodiment of the instant invention with protective cap removed.

As required, detailed embodiments of the instant invention are disclosed herein, however, it is to be understood that the disclosed embodiments are merely exemplary of the invention which may be embodied in various forms.

Therefore, specific functional and structural details disclosed herein are not to be interpreted as limiting, but merely as a basis for the claims and as a representative basis for teaching one skilled in the art to variously employ the present invention in virtually any appropriately detailed structure.

Some basic requirements must be satisfied to ensure that the device described functions safely and as desired. Firstly, the system preferably should not be comprised of any "small parts" which may be considered hazards for inhalation, ingestion or choking by children under age three or who still put small objects into their mouths. Secondly, the system must only utilize materials and ingredients which are suitable for food contact or human consumption. Thirdly, the device of the instant invention must be capable of delivering precisely controlled quantities of the decorating agent. Lastly, the device must not cause significant deformation of the surface of the food to be decorated.

Indicia may be created on the surface of an object by deposition of a substance onto the surface of said object. For example, a liquid paint may be applied to a piece of wood by means of brushing or spraying. Or, the graphite/wax mixture in a pencil lead may be applied to a piece of paper by drawing the tip of the pencil across the paper. Sand paintings may be created by simply permitting one color of sand to fall onto a "canvas" of another color of sand. In each case, the force generated on the substrate by the application means must not significantly exceed the yield strength of the substrate. For example, one could not deposit heavy stones on the surface of a pool of water and expect the stones to remain on the surface of the water. Similarly, wet tissue paper does not provide a suitable substrate when attempting to write with a ball point pen. In both of the above examples, the substrate is incapable of supporting the writing process. If a substrate is to be successfully written upon, the force on the substrate generated by the writing process must be not be significantly greater than the yield point of the substrate. If a non-contact means, such as spraying is used to apply the writing substance, the force generated by the spraying process must be less than the yield strength of the substrate or the substrate will be deformed. If a contact method of applying indicia is used such as that employed through use of a pencil or a felt-tipped marker, then the yield strength of the substrate must not be significantly less than the forces generated by the writing process including the force applied to the substrate which is a result of the force transmitted through the pencil or marker tip. Traditional writing instruments such as pens and markers function well on the substrates for which they were designed to be used such as paper, wood and cardboard. However, if one attempts to use these instruments on surfaces (substrates) which are very soft, ie: have low yield points, these instruments ultimately fail. For example, if one wishes to decorate the surface of a freshly frosted cookie or cake, a pencil will not work. Similarly, ball point pens and felt-tipped markers will also fail. Failure is manifested primarily in two modes. First, the soft frosting may not provide sufficient support to permit satisfactory transfer of the writing agent from the tip of the writing instrument. For pencils and ball point pens to function properly, a certain amount of friction must exist between the writing tip and the surface to be written upon. With very soft substrates, this degree of friction does not exist. Second, the relatively hard tips of these writing instruments will gouge and deform very soft substrates, such as for example, fresh frosting.

Most fresh frostings may be characterized as non-Newtonian, thixotropic fluids with suspended particles. Because these materials are neither solids nor liquids, measurement of some of their physical parameters can be problematic. One of the physical properties of writing substrates that is important is the ability of the substrate to resist deformation during the writing process. Yield point is an indication as to what degree the material can withstand this pressure. While some differences in physical characteristics were noted between brands and types of off-the-shelf, ready-to-spread frostings, these differences were relatively minor. Pillsbury Company's Creamy Supreme Frosting was tested and found to exhibit a yield point of between approximately 10 and 20 grams per square centimeter at 23° C. This figure can be somewhat misleading however, since the frosting product exhibits thixotropic properties and will exhibit a higher instantaneous yield point than that determined through static testing. For example a sufficiently soft, and flexible writing nib can be used to write on the surface of the aforementioned frosting with minimal deformation to the frosting even though instantaneous forces generated by the nib on the frosting somewhat exceed static yield points for the frosting.

In order to produce an effective writing tool for soft frostings and other soft substrates, it is necessary that the force generated by these writing tools on the substrate not significantly exceed the instantaneous yield point of the substrate. To the extent that the force generated by the writing tool exceeds the yield point of the frosting, the writing tool will deform the frosting. While frosting is discussed as the primary substrate in this example, any very soft substrate will present similar problems to writing when using traditional writing instruments. It was not surprising that we were unable to find preexisting writing instruments which possessed the necessary properties to satisfactorily write on soft substrates. Pencils, ball-point pens and felt-tipped markers were tested for this application. The pencils and ball-point pens were incapable of creating any marking agent indicia on the frosting surface. The felt-tipped markers tested were capable of transferring some ink to the frosting but not without causing significant damage to the surface of the frosting. Additionally, the frosting quickly coated the marker nib making further fluid transfer impossible. It was determined that in the case of the tests involving felt-tipped markers that the marker nib was too inflexible to effectively transfer fluid to the surface of the soft frosting without damaging the surface of the frosting. The existing products incorporating felt tips previously discussed and intended for writing on food surfaces were tested in this application as well. While it was found that the products were indeed capable of writing on hard, dry food surfaces such as, for example, a soda cracker or a starch wafer, the products were incapable of satisfactorily writing on soft foods such as fresh frosting or flavored gelatin products. Not only was fluid transfer to soft substrates intermittent and poor but the substrate suffered significant deformation and damage due to the forces exerted on the substrate by the hard nibs in these products. Additionally, it was difficult to accurately control the position of the pen nibs of these products relative to the soft frosting substrate. It should be noted here that this difficulty of control stems from the fact that there is very little tactile feedback to the user when attempting to write on extremely soft substrates. One who is accustomed to writing with a conventional felt-tipped pen on a hard surface, for example, a piece of paper backed up by a counter top, can simply bring the pen tip down to the surface of the paper until it stops. Unless the user is applying an extremely large force to the pen, the pen nib will simply be stopped from further downward travel by the object being written upon.

This is not the case with extremely soft substrates. Indeed, the moment of contact between a marking nib and an extremely soft surface such as fresh frosting can not even be discerned through the resulting back force from the nib acting through the pen body. Attempting to guide a hard nib accurately over the surface of an extremely soft substrate is a nearly impossible task without some form of tactile feedback. If a mechanism could be devised which could provide a buffer between the user's hand motion which is guiding the nib and the possibly, irregular soft surface being written upon it is possible that accurate fluid transfer to extremely soft surfaces could be achieved. A nib which possessed the desirable fluid transfer properties and which was extremely flexible could provide this buffer action by flexing in response to contact with soft substrates. The flexure would help to compensate for variations in forces applied to the pen by the user so that the resulting forces would not be fully transferred to the surface of the substrate. After examining several dozen samples of writing nibs from nib manufactures, it was determined that all such nibs were, too stiff and provided insufficient fluid transfer to the substrate.

Since we were unable to find a commercially produced nib which functioned as desired, a search was initiated to locate a material and develop a process which would produce a nib which would provide acceptable fluid transfer properties when used to write on extremely soft substrates. A large number of materials were tested for this application. Materials tested include open cell polymer foams, sintered porous polymers, felted natural and synthetic fibers and loosely bundled natural and synthetic fibers (like brushes). While some of the materials tested possessed the desired degree of flexibility and other materials tested provided effective fluid absorption and transfer to substrates, only one of the materials tested possessed both properties and functioned well in the intended application. Open cell foam comprised of acetalized polyvinyl alcohol (PVOH, or sometimes referred to as PVA) was not only highly flexible but was also capable of being prepared in a manner in which the foam is extremely hydrophilic. The ability of the foam to readily absorb and transfer aqueous fluids as well as the foam's high degree of flexibility makes it well suited for use as a nib material in the instant invention. PVOH nibs produced were examined under a microscope and compared to the more conventional felt-tipped pen nibs previously tested above. It became apparent that an additional factor was functioning in the PVOH nibs which permitted them to function well for the intended application. The PVOH nibs we prepared are capable of absorbing and holding approximately 10 times their weight in aqueous fluid. Significantly, this fluid is not only present in the interstitial cells within the body of the PVOH structure but the fluid is also highly present at the outer surface of the PVOH structure. This means that whenever the PVOH nib is brought into contact with the surface of another object that the fluid contained on the surface of the nib is instantly available to be transferred to the surface of that object. Additionally, because the cell structure of the PVOH nib is very open, capillary action can readily carry fluid from the interior of the nib to the surface of the nib to replace that fluid transferred to the object being written on. The combination of high flexibility, high hydrophilicity and high levels of fluid at the surface of these nibs make them excellent candidates for writing on extremely soft materials.

A number of nibs were fabricated from PVOH for testing and evaluation. These nibs were fixtured in specially prepared pen barrels and a filled fluid reservoir was coupled to the nib. In all cases the nibs provided excellent fluid transfer to the soft frosting substrates on which they were tested. The nibs were tested on a variety of ready to spread frostings as well as home-made frostings, soft breads, flavored gelatins, apples, crackers and other food items. The pens which employed the PVOH nibs performed surprisingly well on all surfaces and permitted the user to easily draw detailed graphics even on freshly spread frosting. In an effort to quantify the difference between the nibs we produced and those others tested we devised a series of tests.

While it was not initially apparent, we later determined that the special shape of our nibs contributed to their ease of use when writing on extremely soft substrates. We experimented with a variety of shaped nibs including straight round shaft, tapered round shaft, rectangular shafts and chisel shaped tips. After testing our nibs to determine the force exerted by the nib verses pen displacement towards the substrate it became evident that superior performance could be obtained from a nib which was tapered in a concave fashion towards the tip. While conventional felt-tipped pen nibs typically employ a straight conic taper or a bullet shaped convex taper, it was found that the concave taper of the instant invention provided an additional level of control. This additional control is achieved because the concave taper provides for a nib shaft which is not substantially larger than the nib tip which it supports and which shape yields a very gradually increasing force to the substrate with respect to pen displacement towards the substrate. In a conventional pen nib it is desirable to provide as rigid a support as possible for the nib tip so that the user always knows where the nib tip is with respect to the pen barrel. However, when writing on extremely soft substrates, it is far better to let the nib shaft flex so that the nib tip is free to be laterally deflected by the reactive force of the substrate. This concave tapered nib design was scalable, that is, the actual size of the nib did not appear to diminish this added control gained by the special shape of the nib. Additionally, this high degree of nib shaft flexure permits the drawing direction of the pen to be changed without causing significant damage to the soft substrate even though the pen may have not been lifted from the substrate prior to the change in the drawing direction. This is because the highly flexible nib shaft "weather vanes" as the relative direction of the nib to substrate motion is changed. This weather vaning action helps to prevent gouging of the substrate as well since the nib to substrate action is maintained in the dragging mode as opposed to a pushing mode.

A critical requirement of the writing nib in the instant invention is that the pressure exerted by the nib on the writing substrate must not significantly exceed the yield point of the substrate. Significantly larger pressures will result in writing substrate deformation.

Nib pressure on a writing substrate is primarily the result of two factors. The first factor is the relative position of the pen to the writing substrate Generally once the writing nib is in contact with the substrate, moving the pen body closer to the substrate will result in increased nib force and pressure. The second factor affecting nib pressure is nib flexibility. With extremely rigid nibs, even small changes in the relative position -of the pen and the subtrate, will result in significant changes in nib tip force and pressure. When highly flexible nibs are employed, large changes in relative pen location will have minimal effect on nib pressure on the substrate.

In order to quantify forces acting on substrate and nib flexibility, a "displacement versus force" test was devised. This test yielded information on how much a writing nib will bend (or be displaced) when a given force is applied. This figure of flexibility when considered with information on contact area of the nib on the writing surface, provides a writing pressure which can be compared to the substrate yield point to determine the efficacy of the nib. Each nib tested was placed in a pen barrel (or body) as it would be used during writing. The barrel was rigidly attached to a vertical positioner which could be precisely raised and lowered. The barrel and nib was attached in a manner to place the nib at a 45° angle to the writing surface to allow the nib to bend, rather than compress and to simulate normal use. An electronic balance was situated under the writing nib. A grided writing substrate was placed on the balance such that when the pen barrel and nib were lowered, the nib would contact the writing substrate and exert a force on the balance. For each nib tested, three parameters were recorded: vertical position of the pen barrel relative to the substrate; force exerted by the nib on the substrate; and area of contact at each pressure.

Figure 4:
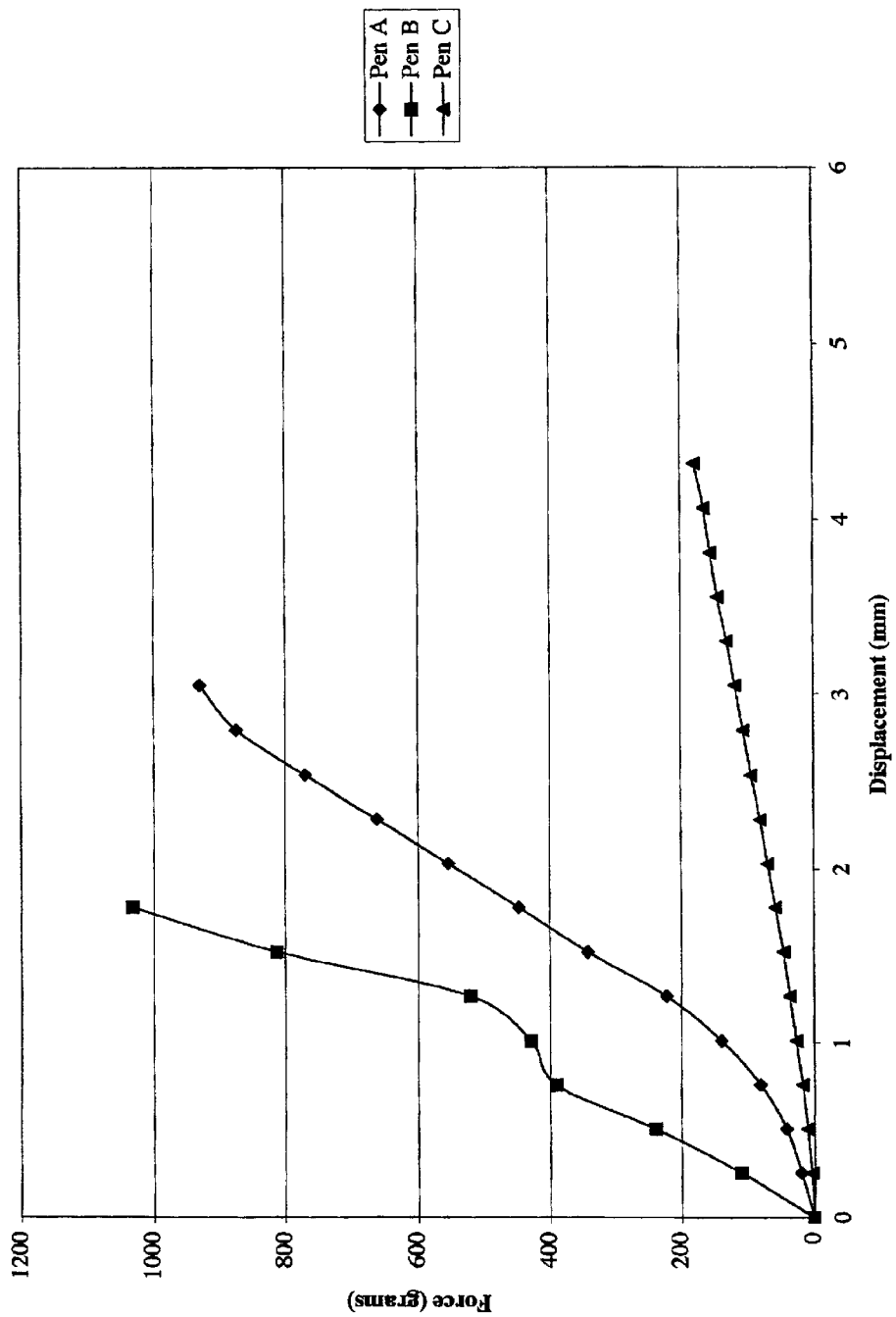
FIGS. 4–7 are graphs relating to the invention and performance thereof.
Figure 5:
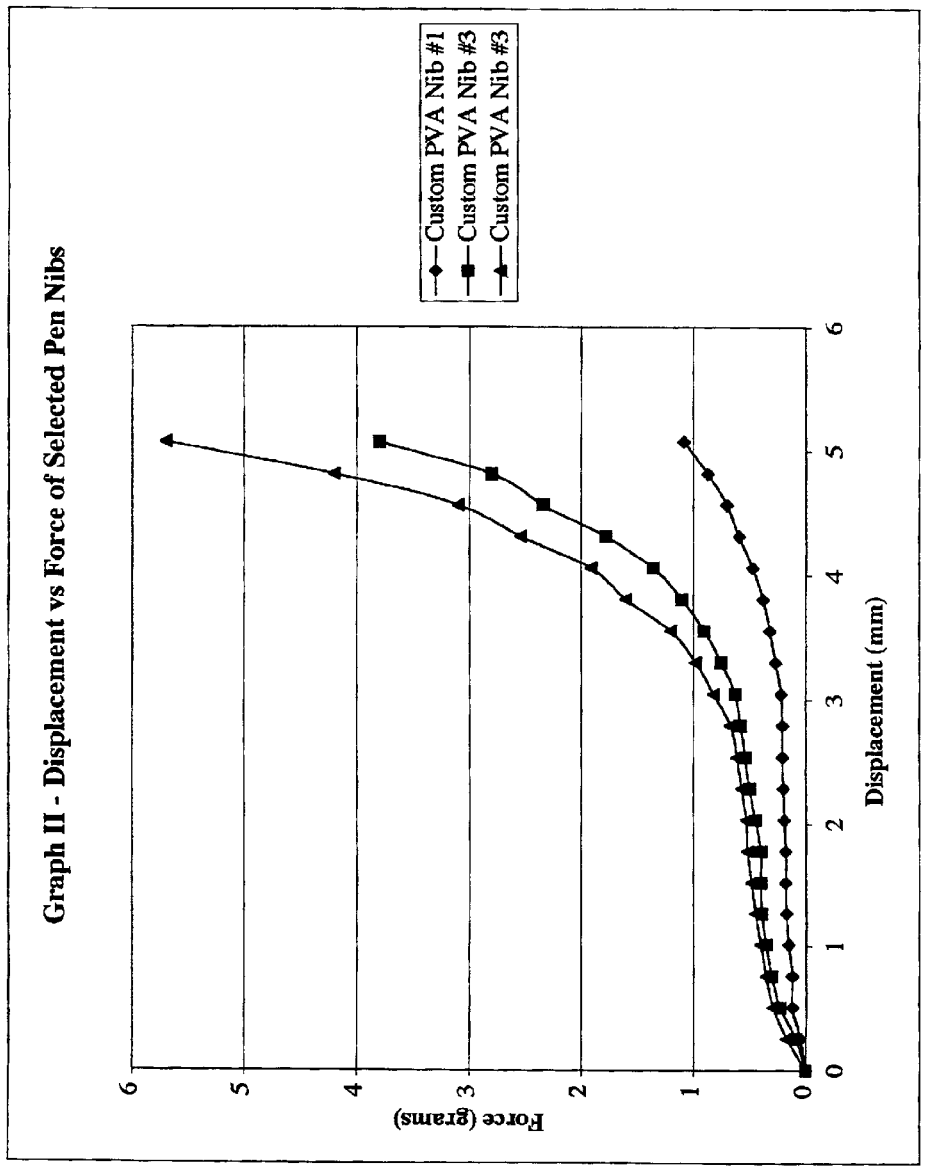
Figure 6:
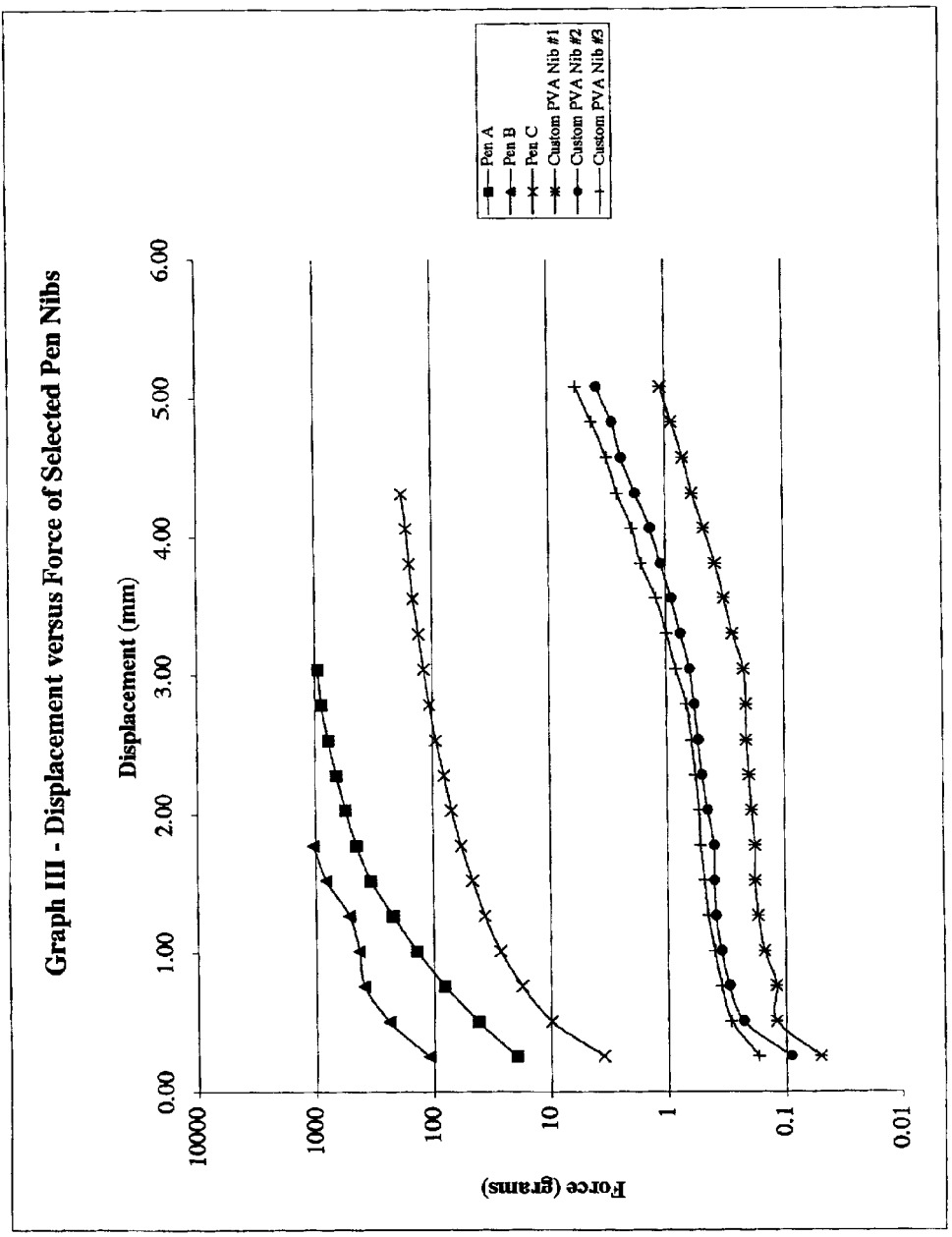

Table I contains the results of tests on nibs found in three commercially available pens, identified as pens A, B and C, as well as three custom manufactured PVA nibs. It should be noted the PVA nibs, when wet, are extremely flexible and exert very little force on the substrate (or test apparatus) even when displaced a significant percentage of their length. The three commercially available nibs exerted significantly higher force for equivalent displacement. A difference of approximately two to three orders of magnitude of nib pressure was noted between the commercially available nibs and the PVA nibs. As such, accompanying Graphs I (FIG. 4) and II (FIG. 5) use different force scales to represent the data and Graph III (FIG. 6) is logarithmic to allow all 6 sets of data to be contained on the same graph.

TABLE I

DISPLACEMENT VERSUS FORCE OF SELECTED NIBS

| Nib | Nib Force (grams) | | | | | |
|---|---|---|---|---|---|---|
| Displacement (mm) | Pen A | Pen B | Pen C | PVA nib 1 | PVA nib 2 | PVA nib 3 |
| 0.00 | 0 | 0 | 0 | 0.00 | 0.00 | 0.00 |
| 0.25 | 20 | 110 | 4 | 0.05 | 0.09 | 0.17 |
| 0.51 | 42 | 239 | 10 | 0.12 | 0.23 | 0.29 |
| 0.76 | 81 | 391 | 18 | 0.12 | 0.30 | 0.35 |
| 1.02 | 139 | 430 | 27 | 0.15 | 0.35 | 0.40 |
| 1.27 | 222 | 520 | 37 | 0.17 | 0.39 | 0.45 |
| 1.52 | 342 | 813 | 46 | 0.18 | 0.40 | 0.48 |
| 1.78 | 447 | 1033 | 58 | 0.18 | 0.40 | 0.52 |
| 2.03 | 554 | — | 70 | 0.19 | 0.45 | 0.53 |
| 2.29 | 661 | — | 80 | 0.20 | 0.50 | 0.57 |
| 2.54 | 769 | — | 93 | 0.21 | 0.54 | 0.61 |
| 2.79 | 874 | — | 106 | 0.21 | 0.58 | 0.67 |
| 3.05 | 930 | — | 118 | 0.22 | 0.63 | 0.82 |
| 3.30 | — | — | 130 | 0.27 | 0.75 | 0.98 |
| 3.56 | — | — | 144 | 0.32 | 0.90 | 1.20 |
| 3.81 | — | — | 155 | 0.38 | 1.10 | 1.60 |
| 4.06 | — | — | 164 | 0.47 | 1.35 | 1.91 |
| 4.32 | — | — | 179 | 0.59 | 1.78 | 2.54 |
| 4.57 | — | — | — | 0.70 | 2.34 | 3.10 |
| 4.83 | — | — | — | 0.87 | 2.80 | 4.20 |
| 5.08 | — | — | — | 1.08 | 3.80 | 5.70 |

Graph I, and the accompanying data from Table I provide data on the three commercially available pen nibs. The three commerically available pen nibs and the three PVA custom nibs were of similar size and shape. Graph I depicts the forces exerted on the electronic balance corresponding to various vertical displacements of the pen body. This test simulates a user touching the pen to a writing substrate and the resulting force applied to that substrate. While the Pen C employed the most flexible nib, it should be noted that even this nib exerted over 100 grams of force for a 3 mm displacement.

Graph II shows the results of force tests on the three custom PVA nibs. Two observations should be noted. First, the force on the electronic balance is significantly less than that of the commercial nibs for equivalent vertical displacement. For a 3 mm movement, less than 1 gram of force was exerted. The second item to be noted is that for the first 3 mm of pen movement, little change in force was recorded. This is a result of the fact that the nib tip and nib shaft were of similar diameters allowing the nib shaft to flex.

Graph III compares test data of displacement versus force for three commercial nibs and the three custom PVA nibs. The difference in writing force between the three custom nibs and the three commercial nibs is dramatic.

Figure 7:
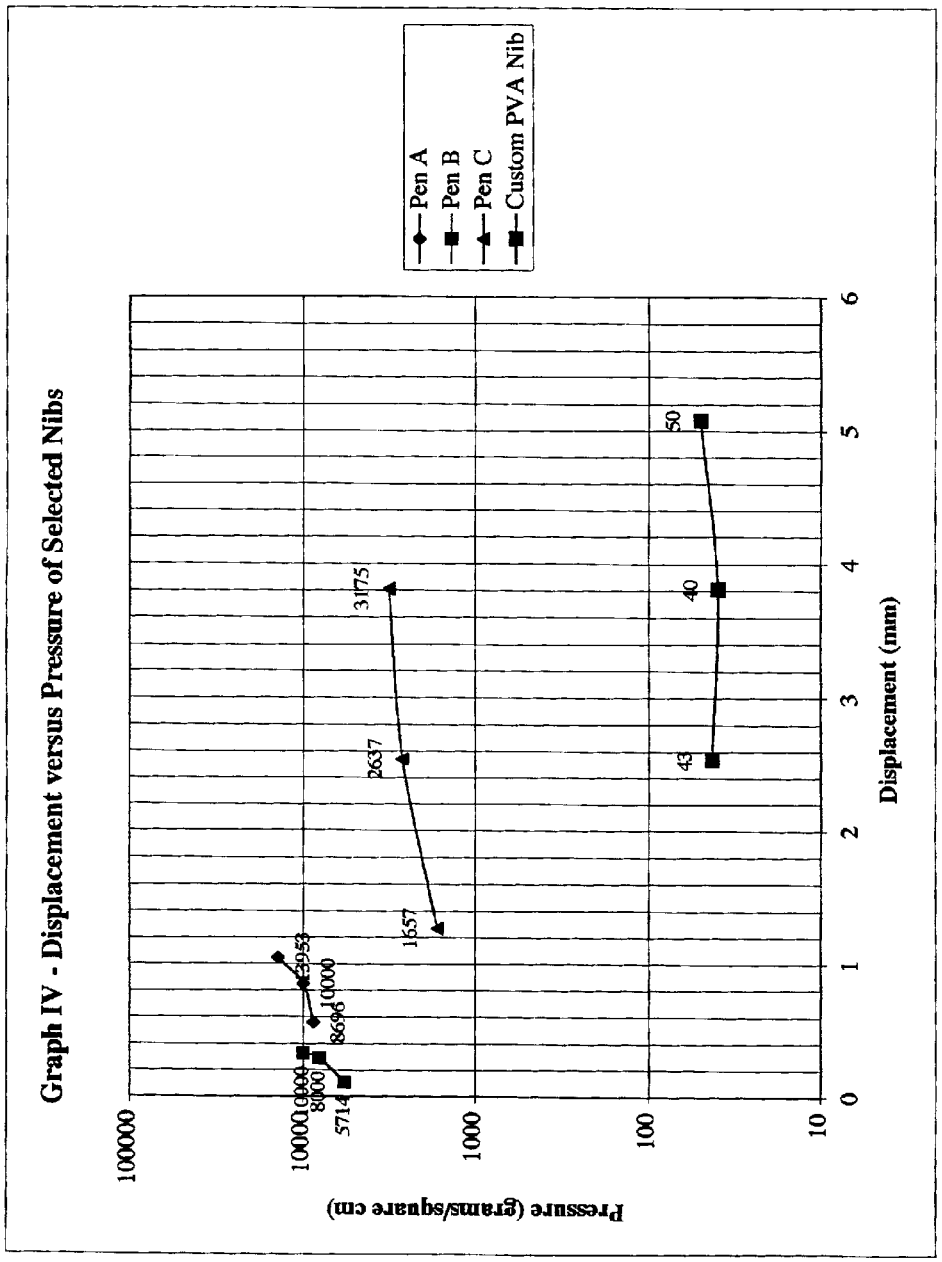

Graph IV (FIG. 7) shows pen displacement (vertical motion) versus pressures generated by four nibs. A representative PVA nib was compared to each of the three commercial nibs and from the above experiment, contact area was measured. Force (in grams) divided by contact area (in square centimeters) yielded pressure (grams/square centimeter). Because two of the commercial nibs are extremely inflexible, it was not possible to flex them to the three or four mm range achieved by the PVA nibs of the instant invention. It is apparent from the data tables and accommodating graphs that the custom PVA nib is orders of magnitude more flexible than any of the three commercial nibs.

Figure 2:
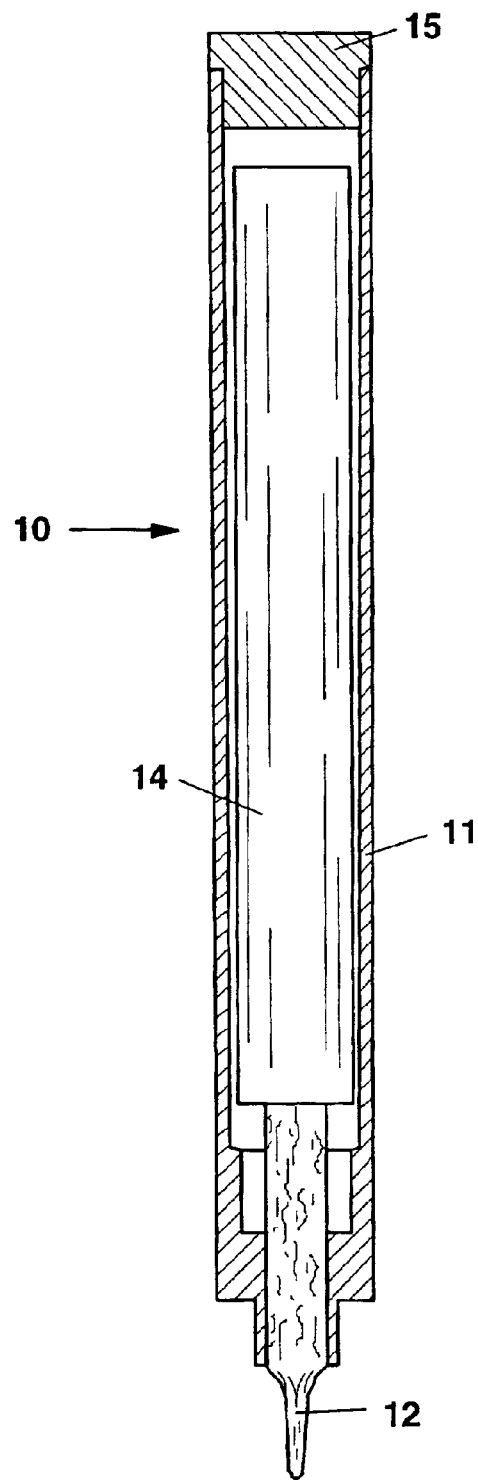
FIG. 2 is a cross sectional view of the device.

FIG. 1 shows one embodiment of the instant invention in which decorating tool 10 comprises a cylindrical reservoir containing a liquid, edible food coloring agent. Preferably, said food coloring agent contains a hygroscopic material such as glycerol or propylene glycol to prevent evaporation of the food coloring and promote storage life. Additionally, a preservative, for example, propylparaben, may be employed to prevent spoilage. A housing 11 has at one distal end a nib 12 which is hydraulically coupled to the fluid contents of housing 11. Said coupling may be of a capillary nature employing various fibers, foams, or other materials as are known in the art. A protective cap 13 serves to protect nib 12 from damage and further to prevent the aforementioned food coloring agent from evaporation or contamination when the device of the instant invention is not being used. Optionally, fragrance or flavor agents may be used either with or in place of the food coloring agent if desired. An internal food coloring agent reservoir 14 shown in FIG. 2 may be used to assist in retaining the fluid and controlling the flow of said fluid to nib 12. Such reservoirs are known in the art and often comprise a thin-walled plastic tube which is packed with a great number of fine plastic fibers, said fibers typically being aligned with the longitudinal axis of the aforementioned thin-walled tube to promote capillary wicking. One company which supplies reservoirs such as these is Filtrona Richmond, Richmond, Va.

Protective cap 13 is preferably designed in such a manner that it does not constitute a small parts hazard. Additionally, it is preferably of a vented design whereby air may pass through its diameter longitudinally. Ventilated designs such as this provide an additional measure of safety should the cap accidentally be inhaled. Plug 15 retains reservoir 14 and may be used to urge reservoir 14 into contact with nib 12. Significantly, nib 12 is specially selected of materials which are acceptable for contact with food or food additives. Additionally, nib 12 must be selected from those materials which are soft and flexible so as to permit application of the food coloring agent to the food surface to be decorated while not significantly altering or displacing the food surface.

In the case of a frosted cake or cookie, nib 12 must be extremely soft. Nibs used in conventional arts and craft "felt pens" as well as those intended for application to food, described previously, are significantly more rigid than those which are satisfactory for application in the instant invention and may cause considerable damage to the surface of the food to be decorated. Extensive testing has shown that specially designed nibs which are fabricated from open cell polymers can function very well in the application of the instant invention. Similarly, suitable nibs may be produced by bundling a plurality of flexible fibers together into a loose group. The preferred embodiment however, employs nibs fabricated from porous, open cell polymer foams or sintered structures.

Particularly useful are foams prepared from polyvinyl alcohol systems which have been cross linked to form solid, open cell structures. The open cell structure may be formed by mechanically frothing the polyvinyl alcohol before cross linking is complete, through the use of chemical blowing agents or, by the inclusion of inert particles such as starch particles in the liquid polyvinyl alcohol solution, which are washed from the polyvinyl alcohol structure after cross linking is complete. These foams are often referred to as PVOH or polyvinyl formal. The foams are relatively rigid when dry, but upon saturation with aqueous fluids become extremely soft and flexible. Because these foams are rigid when dry, they can be readily formed and handled.

Several properties of these foams make them particularly well suited to the application of the instant invention. First, the foam is relatively inert and is non-toxic. Second, because the foam is extremely hydrophilic, it wets quickly and serves as an excellent aqueous fluid transport medium. Unlike many other open cell foams, acetalized polyvinyl alcohol foam possesses excellent fluid transport properties and is capable of releasing fluid easily when brought into contact with another surface. Third the foam is capable of retaining almost 10 times its weight in aqueous fluids which permits the foam to quickly lay down large quantities of fluid when required. The high fluid retention property of PVOH coupled with the high degree of hydrophilicity permits the writing ability of the instant invention to actually be enhanced when used on wet or damp surfaces owing to cohesion between the available fluid in the PVOH nib and the wet surface. Lastly, the foam becomes extremely soft and flexible when wetted with aqueous fluids. The high degree of flexibility of the nib material is particularly important to the instant invention. This flexibility permits a nib to be produced which yields by gentle and controlled bending, even when extremely low forces are applied to the nib. This permits the nib to flex with a lower applied force than that which is required to significantly deform most wet frostings. This means that application of the nib to a soft food (such as wet frosting) results primarily in the bending of the nib rather than deformation of the food surface. The extreme flexibility of the nib also helps to prevent the nib itself from becoming clogged with food particles, particularly frosting.

Since the nib is able to flex during its application to soft foods, the nib bends so that the nib tip and shaft are permitted to glide over the soft food surface rather than being forced through the food. Since forces acting on the food which are generated by the nib of the instant invention are extremely low when compared to forces generated by conventional nibs, and because the relative motion of the nib shaft to the food surface is less perpendicular than that of conventional nibs, the food particles tend not to accumulate on the surface of these special nibs nearly as easily as conventional nibs. Additionally, because the forces between these nibs and the food are lower than those generated by conventional nibs, less food is driven into the pores of the nib, so nib cleaning is required, less often. Another important feature of the nib design of the instant invention is a nib which is highly elastic, that is, a nib which readily returns to its original shape after deflection. The ability to the nib to return to its original shape after contact with the substrate allows the user to use the device more readily since the nib will always return to its original rest state position. Most polyvinyl alcohol nibs which were tested exhibited this desirable elasticity.

Open cell polyvinyl alcohol foams may be produced in which the average pore size is tightly controlled throughout the entire structure. Foams which were found to function well in the application of the instant invention possessed the following characteristics:

| | |
|---|---|
| Porosity | 88–92% |
| Average pore size | 60–300 microns |
| Water absorption rate (% of PVOH mass) | 1020–1300% |
| Pore size distribution | 30–120 microns to 150–400 microns |
| 30% Compressive strength (wet) | 24–86 g/cm$^2$ |

A preferred PVOH foam for use in the instant invention had the following properties:

| | |
|---|---|
| Porosity | 88% |
| Average pore size | 80 microns |
| Water absorption rate (% of PVOH mass) | 1020% |
| Pore size distribution | 30–120 microns |
| 30% Compressive strength (wet) | 86 g/cm$^2$ |

The nibs may be formed by casting and curing to final or near final net shape in molds using liquid polyvinyl alcohol. Alternately, the cured (acetalized) polyvinyl alcohol foam may be dried and then ground or otherwise cut to the desired shape. Dry PVOH foam may also be cut with a laser, while wet foam can be cut with a water jet cutting system. While the nib of the instant invention can function well over a wide range of diameters and lengths, it was found that nibs which were in the range of about 0.25" long to about 0.75" long functioned particularly well when the corresponding relative diameters of the nib were in the range of approximately 0.050" in diameter to approximately 0.200" in diameter. A nib with a gradually tapered, concave form having a generally rounded tip was found to function best for general purpose decorating. Other nib shapes may be employed to produce special effects such as calligraphic writing and so forth.

Figure 3:
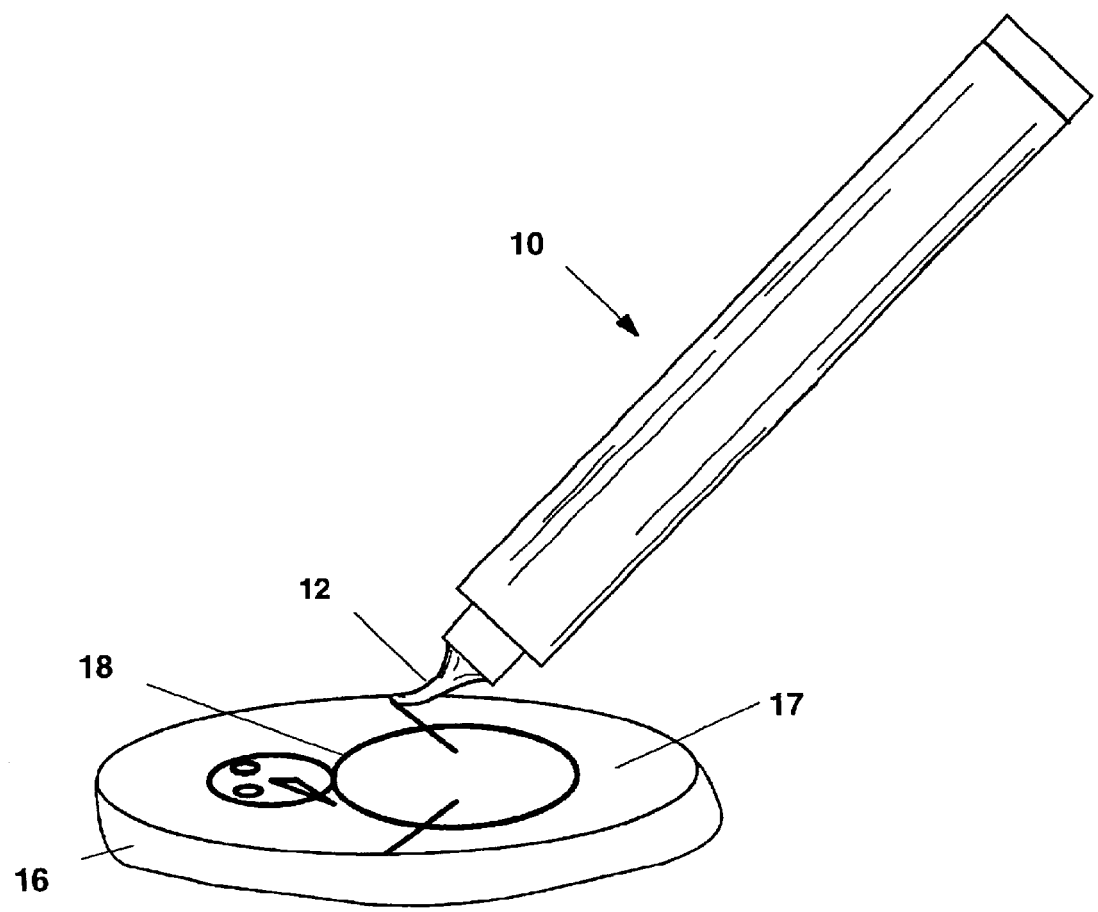
FIG. 3 is a perspective view illustrating operation and application of the device.

FIG. 3 shows the device of the instant invention in use to decorate a frosted cookie. After removing cap 13 from decorating tool 10, nib 12 is brought into contact with, in this case, the surface of frosting base coat 17 on surface of cookie 16 whereby physical contact and capillary action between decorating fluid present on the surface of nib 12 and frosting base coat 17 cause the decorating fluid to be transferred to the surface of frosting base coat 17. The decorating tool 10 is maneuvered in a manner to keep nib 12 in contact with frosting base coat 17 wherever it is desired to impart decorating fluid to the surface of the food. This is an easy task with the instant invention because the highly flexible nib will flex and bend upon contact even with fresh frosting or other very soft surfaces as well as hard surfaces. This flexing action permits the nib to remain in contact with the food surface even if the user's hand is somewhat unsteady or the surface of the food is relatively uneven. The indicia 18 is created by application of the decorating fluid to the food. While the nib design illustrated in FIG. 1 is of a tapered, concave shape, it is envisioned that the nib could also take the form of any other desired shape. Indeed, a portion of the nib may be preformed into a specific shape such as a star or heart so that an image of the desired shape may be imprinted on the food item each time the face of the nib is brought into contact with the food surface.

Testing has shown that the device of the instant invention is highly effective for decorating both hard and soft foods and other surfaces. It is to be understood that the embodiment and methods described herein are exemplary and that other means to accomplish the purpose of the instant invention are anticipated. The dispensing and decorating properties of the instant invention are not limited to applying colors but may also include flavors and fragrances.

What is claimed is:

1. A marking pen for decorating edible food including soft moist frosting or other comparably soft food having a determinable instantaneous yield point without substantially deforming said edible food even when said edible food is said soft, moist frosting or other comparably soft food, said marking pen comprising, in combination:

a container defining an interior containing a colored, edible aqueous liquid decorating substance for decorating said edible food; and an elongated, highly elastic, highly absorbent, highly flexible nib of integral construction formed of highly porous open cell polymer foam material which has solid, open cell structures of high hydrophilicity, said nib being connected to said container with said nib being hydraulically coupled to said colored, edible aqueous liquid decorating substance, said nib being extremely soft and highly flexible when wetted with said colored, edible aqueous liquid decorating substance, said nib having a porous distal end, a porous nib shaft side wall and a nib interior defining voids in fluid flow communication with the interior of said container and with the pores of said porous distal end and said porous nib shaft side wall for receiving said colored, edible aqueous liquid decorating substance from the container interior and conveying said colored, edible aqueous liquid decorating substance to said porous distal end and said porous nib shaft side wall through said nib interior such that high levels of said colored, edible aqueous liquid decorating substance are present at the outer surface of both said porous distal end and said porous nib shaft side wall for application to said edible food due to contact between said porous distal end or said porous nibs haft side wall and said edible food, said nib readily laterally flexing when in contact with said edible food, even when said edible food is said soft moist icing or other comparably soft food, prior to the force applied by said nib to said edible food substantially exceeding the instantaneous yield point of said edible food at the location thereon engaged by said nib when pressure is exerted on said edible food by said nib to substantially prevent deformation of said edible food even when said edible food is said soft, moist frosting or other comparably soft food and the pressure exerted is slight during application of said colored, edible aqueous liquid decorating substance to said edible food by said marking pen, flexing of said nib operable to bring the porous nib shaft side wall into engagement with said edible food and substantially conform to a surface of said edible food such that said colored, edible aqueous liquid decorating substance passes through said porous nib shaft side wall and is applied to said edible food by said porous nib shaft side wall without the force applied by said porous nib shaft side wall to the surface of said edible food substantially exceeding the instantaneous yield point of said edible food even when said edible is said soft, moist frosting or other comparably soft food at the location thereon engaged by said porous nib shaft sidewall when said marking pen is used to decorate said edible food and said nib is pulled along the surface of said edible food, said nib flexing laterally and deflecting to weather vane responsive to changes in the direction of said nib as it is pulled and dragged along the surface of said edible food in engagement therewith even when extremely low forces are applied to said nib, said nib utilizing capillary action to carry said colored, edible aqueous liquid decorating substance from the nib interior to the outer surface of said porous nib shaft side wall and porous distal end and to replace said colored, edible aqueous liquid decorating substance transferred from the nib to said edible food and to maintain a high fluid level at said porous distal end and said porous nib shaft side wall, and said nib responsive to withdrawal of said nib from contact with said edible food to return to its undeflected condition.

2. The marking pen according to claim 1, wherein said open cell polymer foam material is acetalized polyvinyl alcohol.

3. The marking pen according to claim 2, wherein interstitial cells of the acetalized polyvinyl alcohol open cell foam material accommodate said colored, edible aqueous liquid decorating substance.

4. The marking pen according to claim 1, wherein said nib is configured with a concave taper, decreasing in cross-section in the direction of the porous distal end.

5. The marking pen according to claim 1, wherein said open cell polymer foam material has a porosity of from about 88% to about 92%.

6. The marking pen according to claim 1, wherein the average pore size is from about 60 microns to about 300 microns.

7. The marking pen according to claim 1, wherein said open cell polymer foam material has a water absorption rate (percentage of mass) of from about 1,020% to about 1,300%.

8. The marking pen according to claim 1, wherein said open cell polymer foam material has a pore size distribution of from about 30 microns to about 150–400 microns.

* * * * *